(12) United States Patent
Dahlkvist et al.

(10) Patent No.: US 9,134,816 B2
(45) Date of Patent: Sep. 15, 2015

(54) METHOD FOR USING VIRTUAL FACIAL AND BODILY EXPRESSIONS

(71) Applicants: Erik Dahlkvist, Stockholm (SE); Martin Gumpert, Stockholm (SE); Lennart Hogman, Stockholm (SE)

(72) Inventors: Erik Dahlkvist, Stockholm (SE); Martin Gumpert, Stockholm (SE); Lennart Hogman, Stockholm (SE)

(*) Notice: Subject to any disclaimer, the term of this patent is extended or adjusted under 35 U.S.C. 154(b) by 2 days.

(21) Appl. No.: 14/015,652

(22) Filed: Aug. 30, 2013

(65) Prior Publication Data

US 2014/0002356 A1    Jan. 2, 2014

Related U.S. Application Data

(63) Continuation-in-part of application No. 13/434,970, filed on Mar. 30, 2012, now abandoned, and a continuation-in-part of application No. 13/262,328, filed as application No. PCT/US2010/054605 on Oct. 29, 2010.

(60) Provisional application No. 61/260,028, filed on Nov. 11, 2009.

(51) Int. Cl.
*G06F 7/00*        (2006.01)
*G06F 17/30*       (2006.01)
*G06F 3/033*       (2013.01)
*G06K 9/00*        (2006.01)
*H04M 1/725*       (2006.01)

(52) U.S. Cl.
CPC .......... *G06F 3/033* (2013.01); *G06F 17/30259* (2013.01); *G06F 17/30268* (2013.01); *G06F 17/30277* (2013.01); *G06F 17/30613* (2013.01); *G06F 17/30634* (2013.01); *G06F 17/30696* (2013.01); *G06F 17/30716* (2013.01); *G06F 17/30864* (2013.01); *G06K 9/00302* (2013.01); *H04M 1/72544* (2013.01)

(58) Field of Classification Search
CPC .......... G06F 2216/03; G06F 17/30572; G06F 17/30696; G06F 17/30864; G06F 17/30613; G06F 17/30634; G06F 17/30716
See application file for complete search history.

(56) References Cited

U.S. PATENT DOCUMENTS

| | | |
|---|---|---|
| 5,405,266 A | 4/1995 | Frank |
| 7,089,504 B1 | 8/2006 | Froloff |
| 7,244,124 B1 | 7/2007 | Merrill |
| 7,751,599 B2 | 7/2010 | Chen |
| 8,201,080 B2 * | 6/2012 | Basson et al. .................. 715/230 |
| 8,224,106 B2 | 7/2012 | Bing |

(Continued)

OTHER PUBLICATIONS

Justine Cassell, "Animated conversation: rule-based generation of facial expression, gesture & spoken intonation for multiple conversational agents", May 1, 1994, pp. 413-420.*

*Primary Examiner* — Loan T Nguyen
(74) *Attorney, Agent, or Firm* — Fasth Law Offices; Rolf Fasth

(57) ABSTRACT

The method is for using a virtual face or body. The virtual face or body is provided on a screen associated with a computer system having a cursor. A user manipulates the virtual face or body with the cursor to show a facial expression. The communication device determines coordinates of the facial or bodily expression. The communication device searches for facial expression coordinates in a database to match the coordinates. A word or phrase is identified that is associated with the identified facial expression coordinates. The screen displays the word to the user. The user may also feed a word to the computer system that displays the facial expression associated with the word.

7 Claims, 7 Drawing Sheets

(56) References Cited

U.S. PATENT DOCUMENTS

| | | | |
|---|---|---|---|
| 8,271,902 B1* | 9/2012 | Mangini et al. | 715/834 |
| 8,462,996 B2* | 6/2013 | Moon et al. | 382/118 |
| 8,581,911 B2* | 11/2013 | Becker et al. | 345/473 |
| 2004/0001086 A1 | 1/2004 | Brown | |
| 2005/0288954 A1* | 12/2005 | McCarthy et al. | 705/1 |
| 2007/0282765 A1 | 12/2007 | Visel | |
| 2008/0037836 A1* | 2/2008 | Chen et al. | 382/118 |
| 2008/0089561 A1* | 4/2008 | Zhang | 382/118 |
| 2008/0222574 A1 | 9/2008 | Coyne | |
| 2008/0298766 A1* | 12/2008 | Wen et al. | 386/46 |
| 2009/0128567 A1* | 5/2009 | Shuster et al. | 345/473 |
| 2009/0172032 A1* | 7/2009 | Isobe et al. | 707/104.1 |
| 2009/0285456 A1 | 11/2009 | Moon | |

* cited by examiner

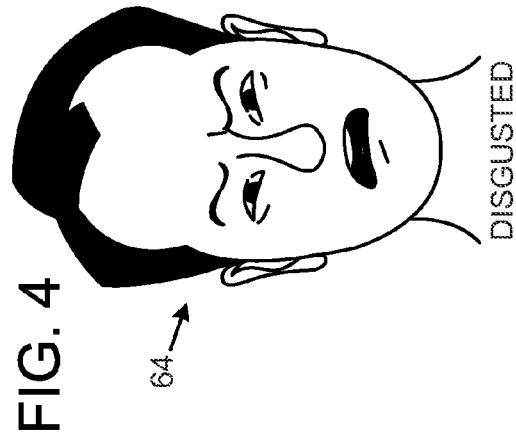
FIG. 2 HAPPY
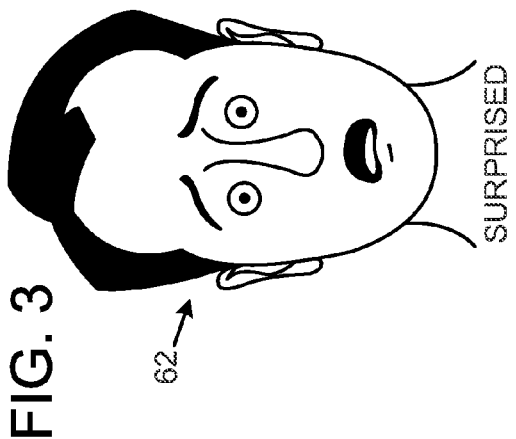
FIG. 3 SURPRISED
FIG. 4 DISGUSTED
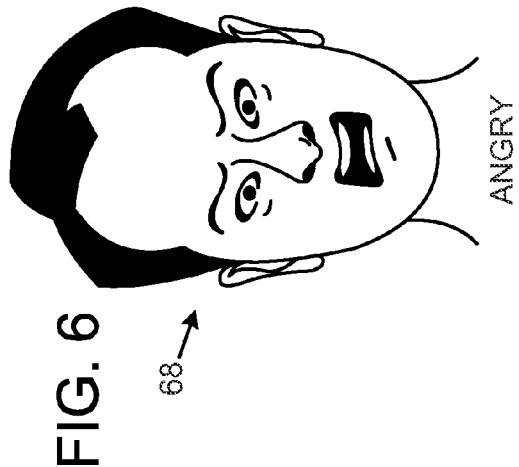
FIG. 5 SAD
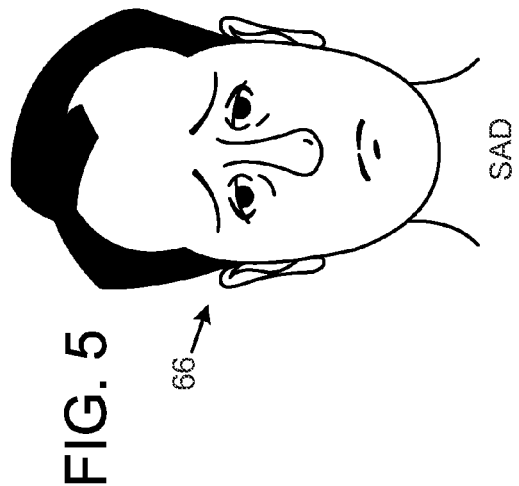
FIG. 6 ANGRY

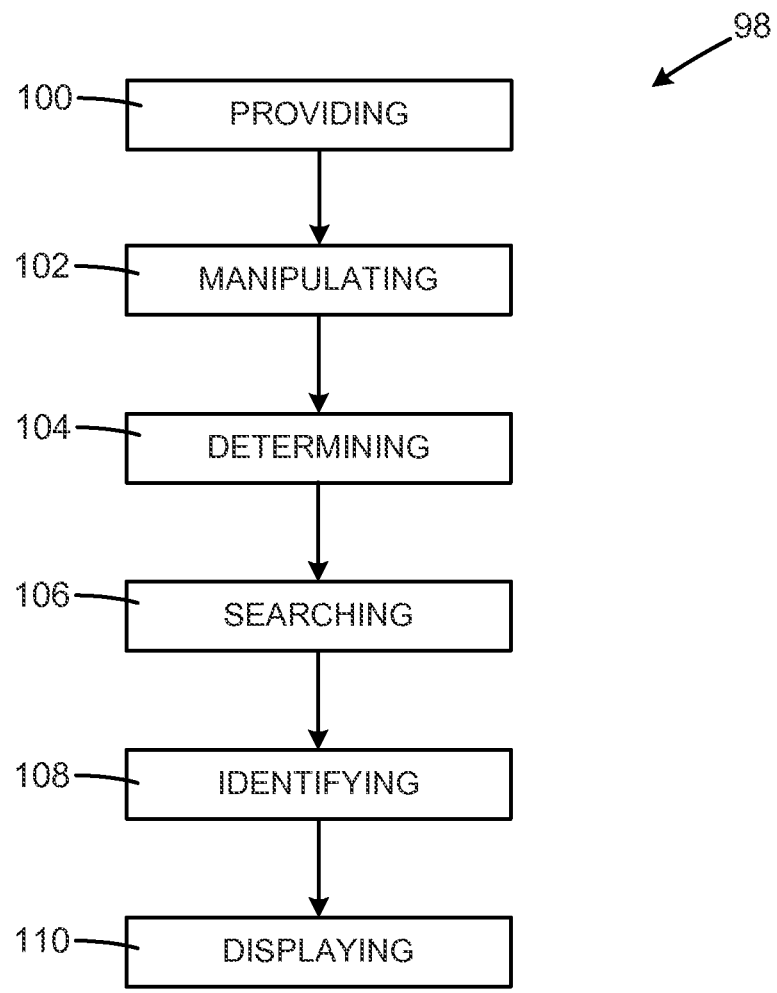

METHOD FOR USING VIRTUAL FACIAL AND BODILY EXPRESSIONS

PRIOR APPLICATIONS

This is a continuation-in-part application of U.S. patent application Ser. No. 13/434,970, filed 30 Mar. 2012 that is a continuation-in-part application of U.S. patent application Ser. No. 13/262,328, filed 30 Sep. 2011 that claims priority from international patent application No. PCT/US2010/054605, on 29 Oct. 2010 and U.S. provisional patent application No. 61/260,028, filed 11 Nov. 2009.

TECHNICAL FIELD

The invention relates to a method for using virtual facial and bodily expressions.

BACKGROUND OF INVENTION

Facial expressions and other body movements are vital components of human communication. Facial expressions may be used to express feelings such as surprise, anger, sadness, happiness, fear, disgust and other such feelings. For some there is a need to train to better understand and interpret those expressions. For example, sales man, police and others may benefit from being able to better read and understand facial expressions. There is currently no effective method or tool available to train or study the perceptiveness of facial and body expressions. Also, in psychological and medical research, there is a need to measure subjects' psychological and physiological reactions to particular, predetermined bodily expressions of emotions. Conversely, there is a need to provide subjects with a device for creating particular, named emotional expressions in an external medium.

SUMMARY OF INVENTION

The method of the present invention provides a solution to the above-outlined problems. More particularly, the method is for using a virtual face or body. The virtual face or body is provided on a screen associated with a computer system that has a cursor. A user may manipulate the virtual face or body with the cursor to show a facial or bodily expression. The computer system may determine coordinates of the facial or bodily expression. The computer system searches for facial or bodily expression coordinates in a database to match the coordinates. A word or phrase is identified that is associated with the identified facial or bodily expression coordinates. The screen displays the word to the user. It is also possible for the user to feed the computer system with a word or phrase and the computer system will search the database for the word and its associated facial or bodily expression. The computer system may then send a signal to the screen to display the facial or bodily expression associated with the word.

In another embodiment, a virtual face or body is provided on a screen associated with a communication device having a cursor. The virtual face or body is manipulated with the cursor to show an expression of feelings. A measurement device determines coordinates of facial components of the expression of feelings. The measurement device determines a direction, speed and acceleration of the facial components on the virtual face. Physiological data of the body are determined. The physiological data consist essentially of skin temperature, skin conductivity, brain frequency and pupil size. The communication device matches the coordinates and measured data of the facial components and physiological data with expression coordinates and data of facial components and physiological data stored in a database. The expression coordinates represent previously stored expression of feelings displayed by the virtual face or body. A written or oral description is associated with the identified facial expression coordinates.

The method further has the step of pre-recording words describing facial expression in the database.

The method further has the steps of the computer using pamphlets of facial expression coordinates of facial expressions in the database and associating each facial expression with the pre-recorded words. The word is fed to the communication device. The communication device identifies the word in the database and associating the word with a facial expression associated with the word in the database.

The screen displays the facial expression associated with the word. A user is trained to identify facial expression. A facial expression is added to an electronic message so that the facial expression identifies a word describing a feeling in the electronic message and displaying the feeling with the virtual face.

BRIEF DESCRIPTION OF DRAWINGS

FIG. 2 is a front view of a virtual facial expression showing a happy facial expression of the present invention;

FIG. 3 is a front view of a virtual facial expression showing a surprised facial expression of the present invention;

FIG. 4 is a front view of a virtual facial expression showing a disgusted facial expression of the present invention;

FIG. 5 is a front view of a virtual face showing a sad facial expression of the present invention;

FIG. 6 is a front view of a virtual face showing an angry facial expression of the present invention;

FIG. 7 is a schematic information flow of the present invention;

DETAILED DESCRIPTION

Figure 1:
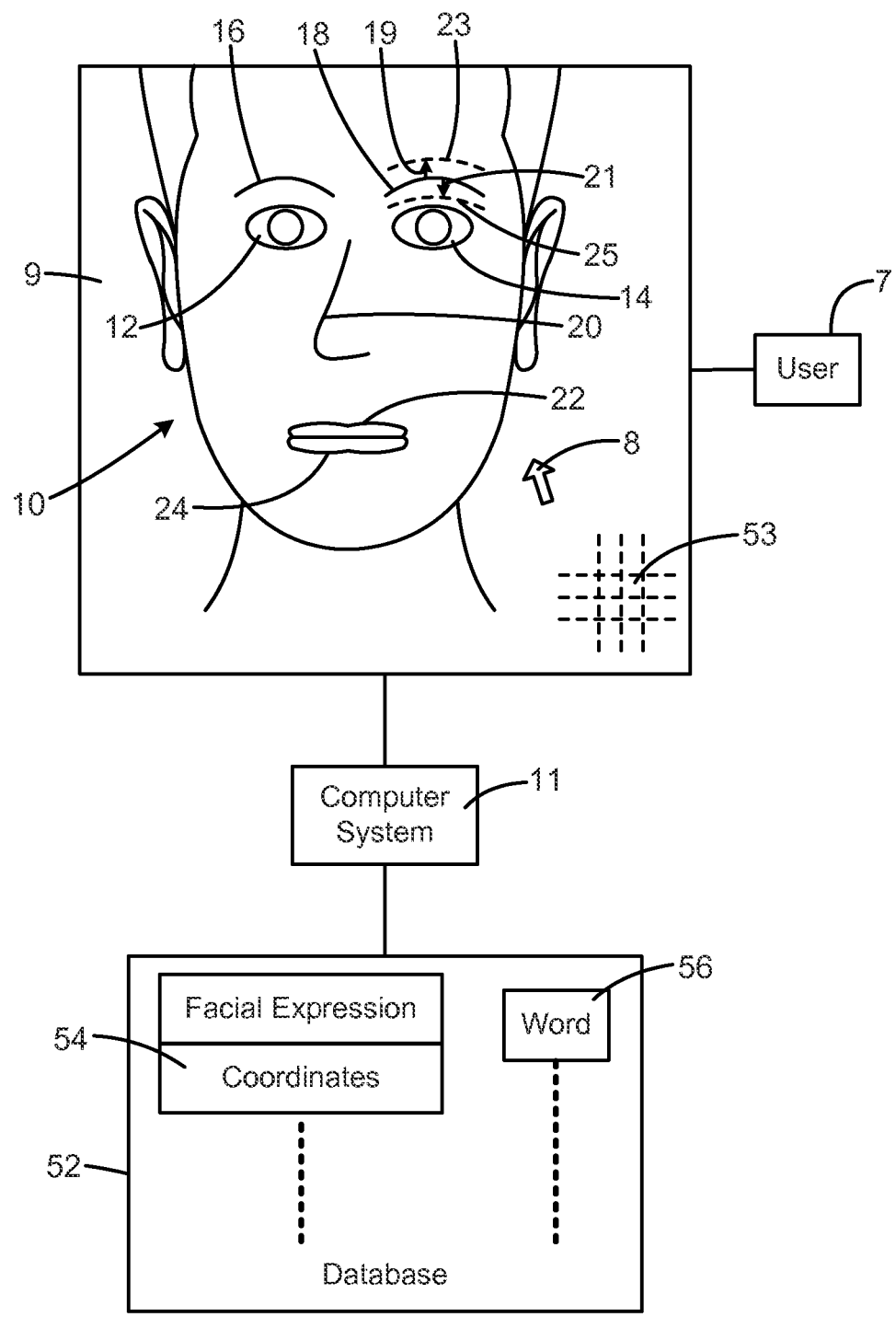
FIG. 1 is a schematic view of the system of the present invention.

With reference to FIG. 1, the digital or virtual face 10 may be displayed on a screen 9 that is associated with a computer system 11 that has a movable mouse cursor 8 that may be moved by a user 7 via the computer system 11. The face 10 may have components such as two eyes 12, 14, eye brows 16, 18, a nose 20 an upper lip 22 and a lower lip 24. The virtual face 10 is used as an exemplary illustration to show the principles of the present invention. The same principles may also be applied to other movable body parts. A user may manipulate the facial expression of the face 10 by changing or moving the components to create a facial expression. For example, the user 7 may use the computer system 11 and point the cursor 8 on the eye brow 18 and drag it upwardly or downwardly, as indicated by the arrows 19 or 21 so that the eye brow 18 moves to a new position further away from or closer to the eye 14 as illustrated by eye brow position 23 or eye brow position 25, respectively. The virtual face 10 may be set up so that the eyes 12, 14 and other components of the face 10 also simultaneously change as the eye brows 16 and 18 are moved. Similarly, the user may use the cursor 8 to move the outer ends or inner segments of the upper and lower lips 22, 24 upwardly or downwardly. The user may also, for example, separate the upper lip 22 from the lower lip 24 so that the mouth is opened in order to change the overall facial expression of the face 10.

The coordinates for each facial expression 54 may be associated with a word or words 56 stored in the database 52 that describe the feeling illustrated by facial expressions such as happy, surprised, disgusted, sad, angry or any other facial expression. FIG. 2 shows an example of a happy facial expression 60 that may be created by moving the components of the virtual face 10. FIG. 3 shows an example of a surprised facial expression 62. FIG. 4 shows a disgusted facial expression 64. FIG. 5 shows a sad facial expression 66 and FIG. 5 shows an example of an angry facial expression 68.

When the user 7 is complete with the manipulating, moving or changing of the components, such as the eye brows, the computer system 11 reads the coordinates 53 (i.e. the exact position of the components on the screen 9) of the various components of the face and determines what the facial expression is. The coordinates for each component may thus be combined to form the overall facial expression. It is possible that each combination of the coordinates of the facial expressions 54 of the components may have been pre-recorded in the database 52 and associated with a word or phrase 56. The face 10 may also be used to determine the required intensity of the facial expression before the user will see or be able to identify a certain feeling, such as happiness, expressed by the facial expression. The user's time of exposure may also be varied and the number or types of facial components that are necessary until the user can identify the feeling expressed by the virtual face 10. As indicated above, the computer system 11 may recognize words communicated to the system 11 by the user 7. By communicating a word 56 to the system 11, the system preferably searches the database 52 for the word and locates the associated facial expression coordinates 54 in the database 52. The communication of the word 56 to the system 11 may be orally, visually, by text or any other suitable means of communication. In other words, the database 52 may include a substantial number of words and each word has a facial expression associated therewith that have been pre-recorded as pamphlets based on the positions of the coordinates of the movable components of the virtual face 10. Once the system 11 has found the word in the database 52 and its associated facial expression, the system sends signals to the screen 9 to modify or move the various components of the face 10 to display the facial expression associated with the word. If the word 56 is "happy" and this word has been pre-recorded in the database 52 then the system will send the coordinates to the virtual face 10 so that the facial expression associated with "happy" will be shown such as the happy facial expression shown in FIG. 2. In this way, the user may interact with the virtual face 10 of the computer system 11 and contribute to the development of the various facial expressions by pre-recording more facial expressions and words associated therewith.

It is also possible to reverse the information flow in that the user may create a facial expression and the system 11 will search the database 52 for the word 56 associated with the facial expression that was created by the user 7. In this way, the system 11 may display a word once the user has completed the movements of the components of the face 10 to create the desired facial expression. The user may thus learn what words are associated with certain facial expressions.

It may also be possible to read and study the eye movements of the user as the user sees different facial expressions by, for example, using a web camera. The user's reaction to the facial expressions may be measured, for example the time required to identify a particular emotional reaction. The facial expressions may also be displayed dynamically overtime so illustrate how the virtual face gradually changes from one facial expression to a different facial expression. This may be used to determine when a user perceives the facial expression changing from, for example, expressing a happy feeling to a sad feeling. The coordinates for each facial expression may then be recorded in the database to include even those expressions that are somewhere between happy expressions and sad expressions. It may also be possible to just change the coordinates of one component to determine which components are the most important when the user determines the feeling expressed by the facial expression. The nuances of the facial expression may thus be determined by using the virtual face 10 of the present invention. In other words, the coordinates of all the components, such as eye brows, mouth etc., cooperate with one another to together form the overall facial expression. More complicated or mixed facial expressions, such as a face with sad eyes but a smiling mouth, may be displayed to the user to train the user to recognize or identify mixed facial expressions.

By using the digital facial expression of the present invention, it may be possible to enhance digital messages such as SMS or email with facial expressions based on words in the message. It may even be possible for the user himself/herself to include a facial expression of the user to enhance the message. The user may thus use a digital image of the user's own face and modify this face to express a feeling with a facial expression that accompanies the message. For example the method may include the step of adding a facial expression to an electronic message so that the facial expression identifies a word describing a feeling in the electronic message and displaying the feeling with the virtual face.

Cultural differences may be studied by using the virtual face of the present invention. For example, a Chinese person may interpret the facial expression different from a Brazilian person. The user may also use the user's own facial expression and compare it to a facial expression of the virtual face 10 and then modify the user's own facial expression to express the same feeling as the feeling expressed by the virtual face 10.

FIG. 7 illustrates an example 98 of using the virtual face 10 of the present invention. In a providing step 100, the virtual face 10 on the screen 9 associated with the computer system 11. In a manipulating step 102, the user 7 manipulates the virtual face 10 by moving components thereon such as eye brows, eyes, nose and mouth, with the cursor 8 to show a facial expression such as a happy or sad facial expression. In a determining step 104, the computer system 11 determines the coordinates 53 of the facial expression created by the user. In a searching step 106, the computer system 11 searches for facial-expression coordinates 54 in a database 52 to match the coordinates 53. In an identifying step 108, the computer system 11 identifies a word 56 associated with the identified facial expression coordinates 54. The invention is not limited to find just identifying a word but other expressions such as phrases are also included. In a displaying step 110, the computer system 11 displays the identified word 56 to the user 7.

Figure 8A:
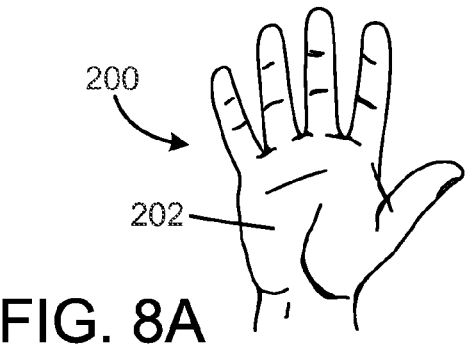
FIGS. 8A and 8B are views of a hand.
Figure 8B:
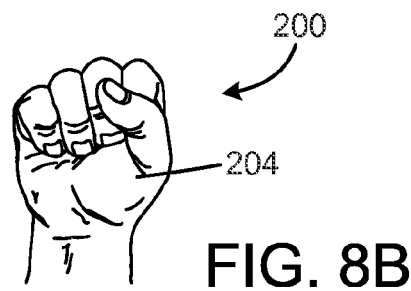
Figure 9A:
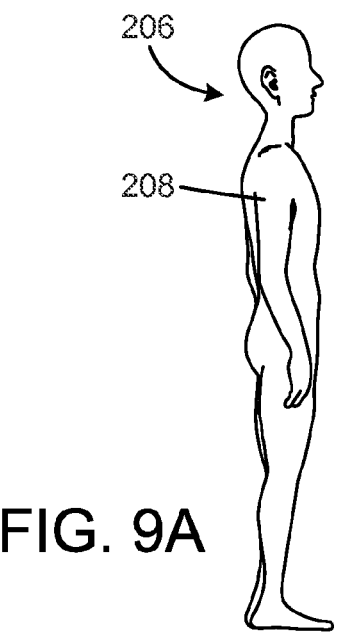
FIGS. 9A and 9B are views of a body.
Figure 9B:
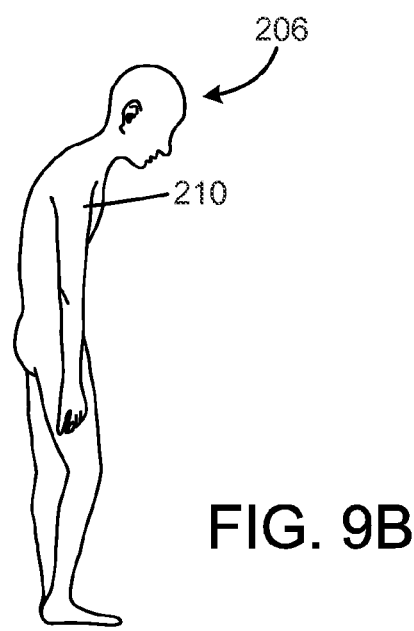
Figure 10A:
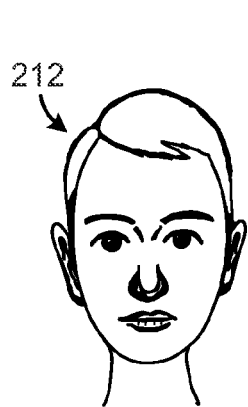
FIGS. 10A, 10B and 10C are views of a face.
Figure 10B:
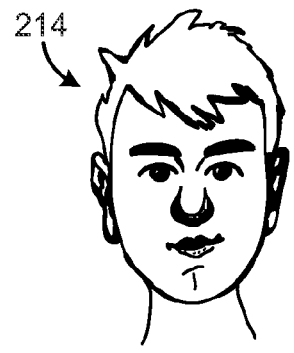
Figure 10C:
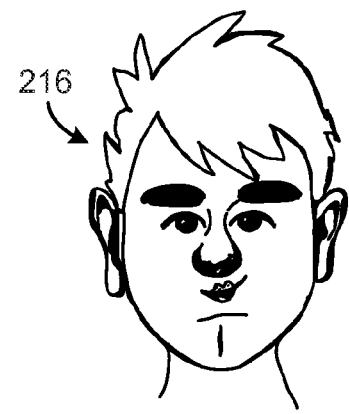

The present invention is not limited to computer systems but any communication device may be used, including, but not limited, to telephones, mobile and smart phones and other such digitized display and communication devices. Also, the present invention is not limited to facial expressions. Facial expressions are only used as an illustrative example. Examples of other body or bodily expressions are in FIGS. 8-9. Bodily expressions together with facial expressions may be used although facial expressions are often most important. More particularly, FIG. 8A shows a hand 200 in an opened position 202 while FIG. 8B shows the hand 200 in a closed position 204 i.e. as a closed fist. FIG. 9A shows a body 206 in an erect position 208 while FIG. 9B shows the body 206 in a slumped position 210. FIGS. 10A-C show different facial expressions 212, 214 and 216 of a face that includes a mixture of different feelings. It is important to realize that the coordinates describing the face or body are movable so it is possible to create dynamic sequences of a dynamic expression coding system that may be used to describe different expressions of feelings. The coordinates are thus the active units in the virtual face or on the body that are moved to gradually change the expressions of feelings displayed by the face or body. The coordinates may be used for both two and three dimensional faces and bodies. Certain coordinates may be moved more than others and some coordinates are more important to display expressions of feelings when interpreted by another human being. For example, the movement of portions of the mouth and lips relative to the eyes are more important when expressing happiness compared to movements of coordinates on the outer end of the chin. One important aspect of the present invention is to register, map and define the importance of each coordinate relative to one another and the difference in importance when analyzing expressions. Not only the basic emotional expressions such as happiness, sadness, anger etc. but also expressions that mix several basic expressions are analyzed. Source codes of coordinates for expressions of feelings may be recorded in databases that are adjusted to different markets or applications that require the need for correct expressions of feelings such as in TV games, digital films or avatars on the Internet and other applications such as market research and immigration applications. It is important to realize that the present invention includes a way to create virtual human-beings that expresses a predetermined body language. This may involve different fields of coordinates that may be used to describe portions of a face or body. The field of coordinates related to the eye and mouth are different for different types of expressions. For example, the field of coordinates of the eye may show happiness while the field of coordinates of the mouth may show fear. This creates mixed expressions. The fields of coordinates are an important part of the measurements to determine which expression is displayed. A very small change of certain coordinates may dramatically change the facial expression as interpreted by other human-beings. For example, if all coordinates of a face remain the same but the eyebrows are rapidly lifted, the overall facial expression changes completely. However, a change of the position of the chin may not have the same impact.

It is possible to use a dynamic expression coding system to measure or produce predetermined dynamic and movable expressions of feelings. There are at least two options. A whole digital human-being, a digital face or body may be manipulated by using a cursor or pointer to obtain information about the expressions that are displayed. For example, the pointer may be used to lower the eyebrows and the level of aggression may be changed. It is also possible to obtain a description, such as in words or voice, of the expression displayed by the digital human being or face. It is also possible to add a command such as "happy" to the system a happy face or body is displayed. The dynamic movement, that is movement over time, may be obtained by moving the coordinates and their pre-programmed relationship to one another. In this way, the expressions may be displayed dynamically so that the expression is gradually changed from, for example, 20% happy to 12% sad. The dynamic changes may be pre-programmed so that the coordinates for each step in the change are stored in the database. The correct interpretation of each expression may be determined empirically to ensure correct communication between the receiver and sender. In other words, the user may slightly change the facial or bodily expression by changing a command from, for example, 20% happy to 40% happy. Based on empirical evidence, the system of the present invention will change the expression so that the face looks more happy i.e. 40% happy instead of just 20% happy to most other human beings. This interactive aspect of the invention is important so that the user may easily change the facial expression by entering commands or the system may easily interpret a facial expression by analyzing the coordinates on the virtual face or body and then provide a description of the facial expression by searching in the database for the same or similar coordinates that have been pre-defined as describing certain facial or bodily expressions. The database may thus include facial or bodily coordinates that are associated or matched with thousands of pre-recorded facial or bodily expressions. The pace of the change may also be important. If the change is rapid it may create a stronger impression on the viewer so that the face looks more happy compared to a very slow change. It is also possible to start with the facial expression and have the system interpret it and then provide either a written or oral description of the facial expression. The coordinates may thus be used to not only help the viewer interpret a facial expression by providing a written or oral description of the facial expression but also be used to create a facial or bodily expression based on written or oral commands such as "Create a face that shows 40% happiness." The system will thus analyze each coordinate in the face and go into the database to determine which pre-stored facial expression best matches the facial expression that is being displayed based on the position of the coordinates in the virtual face compared to the coordinates in the pre-stored facial expression. The database thus includes information for a large variety of facial expression and the position of the coordinates for each facial expression. As a result, the system may display a written message or description that, for example, the face displays a facial expression that represents 40% happiness. As indicated above, the coordinates are dynamic and may change over time similar to a short film. In this way, the facial expression may, for example, change from just 10% happy to 80% happy by gradually moving the coordinates according to the coordinate information stored in the database.

It is also important to describe the motion dynamics of the virtual face as the facial expressions change. The movement of the coordinates of the components of the face of the person should be analyzed based on the position of the facial components, the speed of the movement of the facial components and the acceleration of the movement of the facial components. By determining the position, speed and acceleration/deceleration of the movement of the facial components the emotional state can be more accurately determined. In other words, the emotional state or expression is defined or determined by not only the original position of the facial components but also by the speed and acceleration/deceleration of the movement of the facial components. A higher speed and/ or acceleration/deceleration of the movements are indications of a more intense feeling being expressed. It is very important to not only describe the direction of the movement of the facial components but also of the speed and acceleration to more accurately simulate and interpret the meaning of the facial expression. For example, a "terrified" expression usually requires more rapid and higher acceleration movements compared to a "concerned" expression. The fact that three movement characteristics (direction, speed and acceleration) are used it is easier to, via empirical studies, find the relevant coordinates for each human being that may have different facial shapes and repertoire of expressions. It was surprisingly discovered that it is not obvious how various emotional expressions differ from one another when changing the movement pattern of the face and body. It was unexpectedly discovered that it was not enough to just measure and determine how coordinates have moved from one spot to another in order to accurately determine the character and intensity of the emotional expression. The measurement and study of the direction, speed and acceleration of the coordinates are vital. For example, if a mouth is opened large but slowly that may create a facial expression of breathless excitement but if the mouth is opened in the same way but more quickly, i.e. at a high acceleration, this may create a facial expression of fear, astonishment or surprise. It was also unexpectedly discovered that the speed and acceleration of components in different parts of the face are important and that certain parts are much more important than others when it comes to determining the quality and intensity of the emotional expressions. For example, if a person is blinking his/her eyes rapidly while slowly smiling this may create a facial expression of an ambiguous character instead of expressing friendliness. Similar, if a person is smiling too quickly so that the smiling process is very short this may create a facial expression of an in-genuine smile that is not necessarily friendly. It is important to realize that a "faster" smile does not necessarily mean that the person is happier. It is often necessary to set the boundaries and try to determine what happens to the facial expressions when the movements are too slow or too fast. In other words, the speed and acceleration of the smile must be just right to give a friendly facial expression of a happy person i.e. if the movements are too slow the person gives the impression of being only mildly or hesitantly happy and when they are too fast the person may, as indicated above, show an in-genuine appearance of being pleased. By measuring and determining the speed, acceleration and direction of the coordinates, it was unexpectedly discovered that the accuracy of the interpretation of the intensity and character of the facial expressions improved greatly since even small changes in the direction, speed and acceleration of the coordinates may mean that the viewer's interpretation of the expression changes greatly.

It is also easier to distinguish facial expression for different emotional states that are otherwise easy to mix-up such as expressions showing "fear" and "surprise." It is also easier to relate different facial expressions for different emotions to other aspects of emotions such as dimensions of experience i.e. level and developed empathy of the viewer and physiological reactions.

It is also possible to create a field of coordinates that has coordinates that are correlated to one another such as coordinates associated with muscles that control the movements of the mouth and eyebrows are merged into the field of coordinates. The field of coordinates may be determined by conducting empirical studies. It is important that the fields of coordinates can be manipulated independently of one another.

Because the fields of coordinates can be manipulated independently of one another and with different intensity levels, it is possible to study the coordination between different fields of coordinates such as when mixed emotions are expressed i.e. movements of the eyes and mouth while expressing anger and fear at the same time.

Another important feature is that for each emotional state or expression there is a code that is associated not only with a word that corresponds to and describes the emotional state or expression but also to the associated behavior and physiological changes of the body and face of the person such as crying, blushing and increase of heart frequency. The code may be used to systematically relate facial expressions with different aspects of emotions based on empirical studies that are stored in a database. Some of these aspects include changes of the brain frequency, the electrical conductivity of the skin and the size of the pupil of the eye. Other aspects include brain images especially the part of the brain related to the generation of emotions and temperature changes of the skin. Information of the various test data of physiological changes during the facial expressions is stored in the database of a computer that may store, determine and retrieve data from the database as desired including but not limited to physiological data but also information related to the virtual face such as movement of the coordinates. This means not only the position, speed and acceleration of the facial or bodily components are measured or determined but also certain physiological data are determined such as the skin temperature when deciding which emotion the facial/bodily expression is showing in order to generate the code that represents the facial expression. In other words, the combination of the movement of the facial components and physiological data are used by the computer to determine which emotion is expressed by the face or body. Once the movement and physiological data are determined, the user may go into the database to find the code for the most similar or suitable pre-stored facial expression, which movement data and physiological data are stored in the database that best matches the current facial expression that is being investigated or analyzed.

In operation, the measurement instrument measures data such as the facial movement of the positions of the facial components including the distance/direction of the movement of the facial component and the speed and acceleration of the facial components. The measurement instrument also measures physiological data on the body of the person analyzed such as skin temperature, skin conductivity, brain frequency, and the size of the pupil of the eye. The measured data are sent in an identical signal to a database that has pre-stored data related to the movement of the facial components and physiological data associated with facial expressions. The database is searched for the most suitable facial expression. Once the most suitable facial expression is found and the code associated therefore, the database sends back a return signal that includes the code for the most suitable facial expression that best matches the data included in the identification signal. The user may then use the code to retrieve the most suitable facial expression and a description of the emotion it expresses. The associated emotion is then selected as the emotion that best represents the emotion expressed by the face of the person analyzed.

The present invention also includes a measurement instrument or method to determine the intensity of the expressions that are expressed by moving coordinates or vectors of the face. It is an instrument to determine, based on the digitally displayed face, where in the face certain movements affect the emotion displayed. The key coordinates are determined and may be corrected afterwards based on what a viewer perceive as the intensity of the emotion expressed. It may even possible to make this type of correction in real time when a sufficient amount of data-bases are available. One feature is that the emotional expressions are not expressed in words but in codes based on the coordinates and the intensity of the expression displayed as measured in a percentage scale 0-100%. As mentioned above, the direction of the movement of the coordinates, the speed and acceleration are considered in the evaluation and determination of what expression is being displayed.

Figure 11:
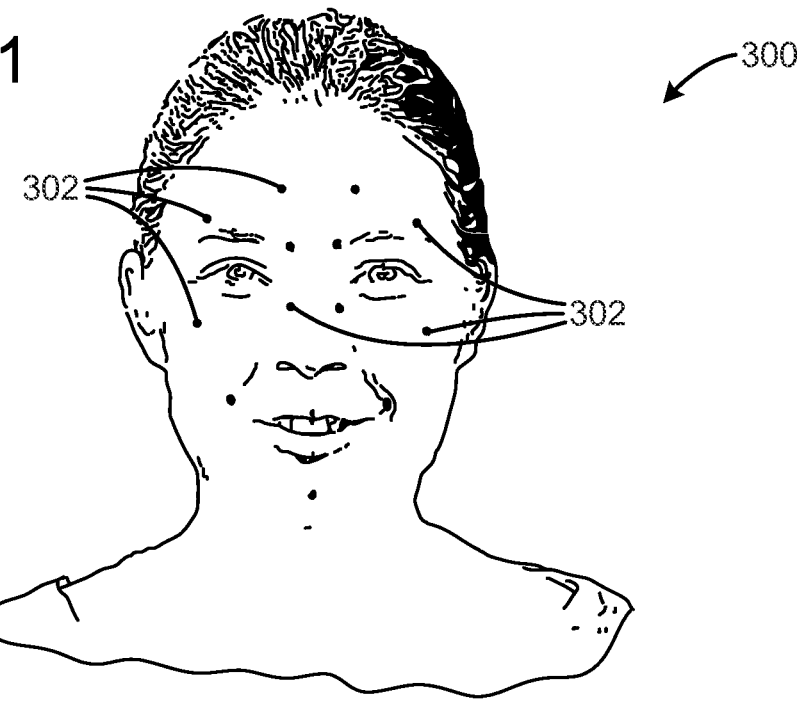
FIG. 11 is a front view of a face being marked with coordinates.

FIG. 11 shows a digital or virtual face 300 that has coordinates 302 shown as dots on the face 300. The relative movements of the coordinates 302 are measured i.e. whether they move towards or away from one another. This is then associated with the perceived emotional intensity, on a scale of 0-100%, displayed by the face 300. The resolution of the coordinates may vary similar to a photographic image or picture.

Figure 12:
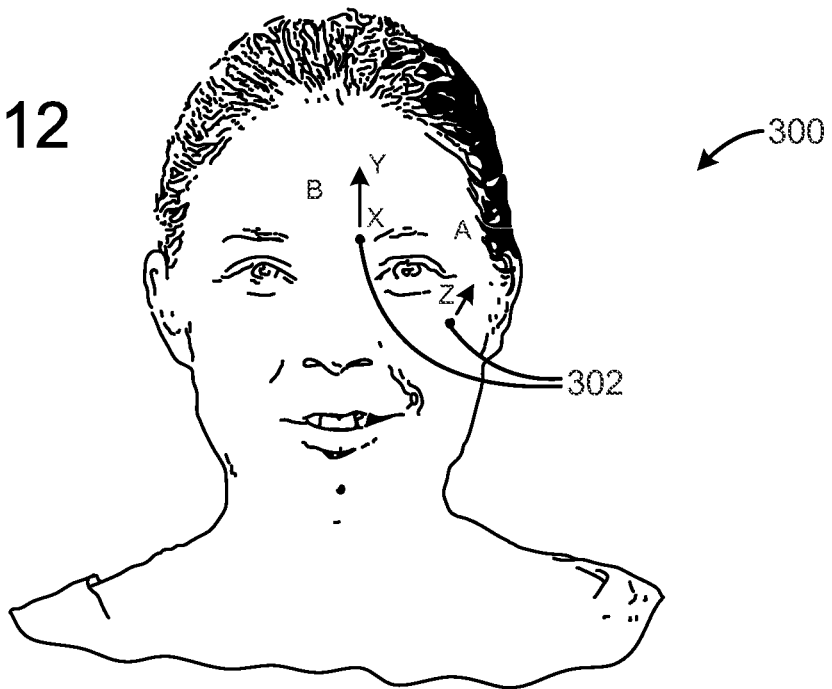
FIG. 12 is a front view of the face of FIG. 11 showing movement of coordinates.

FIG. 12 illustrates that the speed of the movement of the coordinates 302 is measured in x-y-z dimensions to determine the intensity of the expression displayed or the how intense the displayed expression is perceived by a viewer. The acceleration of the movement of the coordinates 302 may also be measured such as in the x-y dimensions to determine the intensity of the expression displayed or the how intense the displayed expression is perceived by a viewer.

Figure 13:
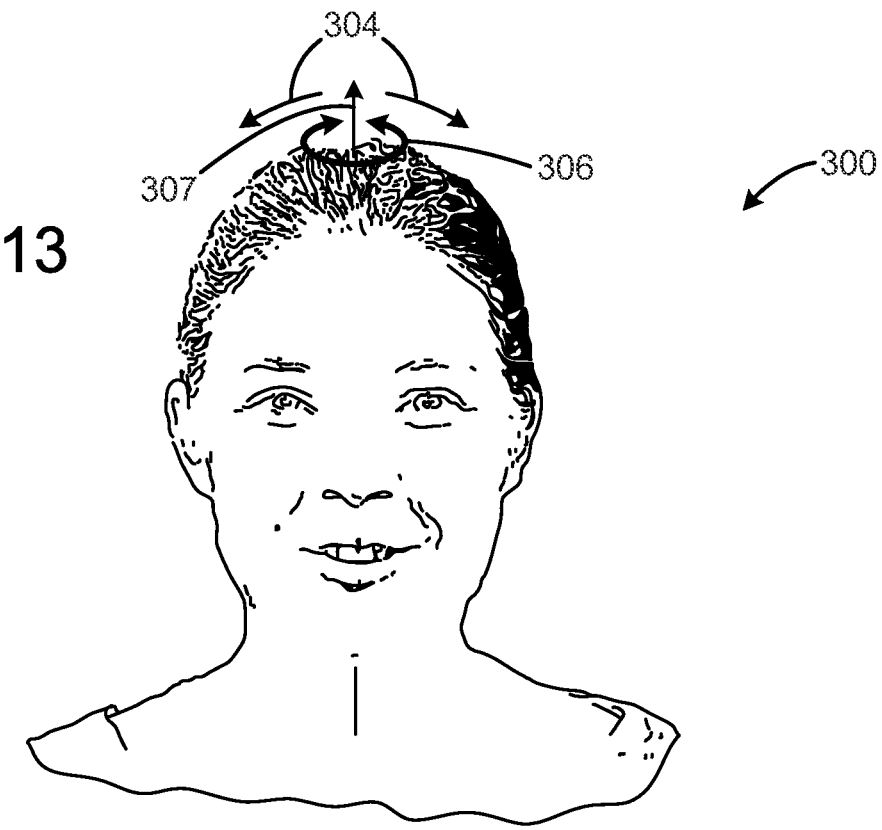
FIG. 13 is a front view of the face of FIG. 11 showing movement of the head.

FIG. 13 illustrates that the sideways position 304 of the head 305 having the face 300 may be measured as well as vertical movement 307 and rotation 308 of the head 306.

Figure 14:
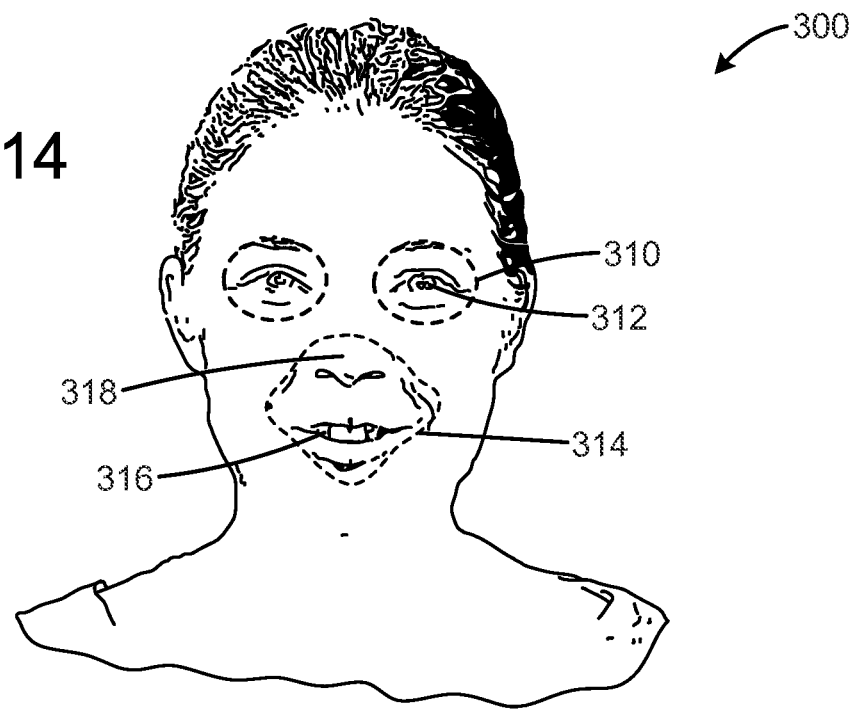
FIG. 14 is a front view of the face of FIG. 11 showing fields of coordinates.

FIG. 14 illustrates the measurement of fields of coordinates. The cooperation of the coordinates regarding velocity and acceleration is measured on the face and the body as a whole. It is also possible to focus on fields of coordinates such as the field 310 across and/or around the left eye 312 or the field 314 that includes the mouth 316 and nose 318. This is particularly important when mixed feelings are expressed such as when the mouth 316 expresses a happy emotional expression while the eyes express a sad emotional expression. The fields 310 and 314 may include many coordinates or vectors i.e. many coordinates that have a certain direction marked with arrows.

Figure 15:
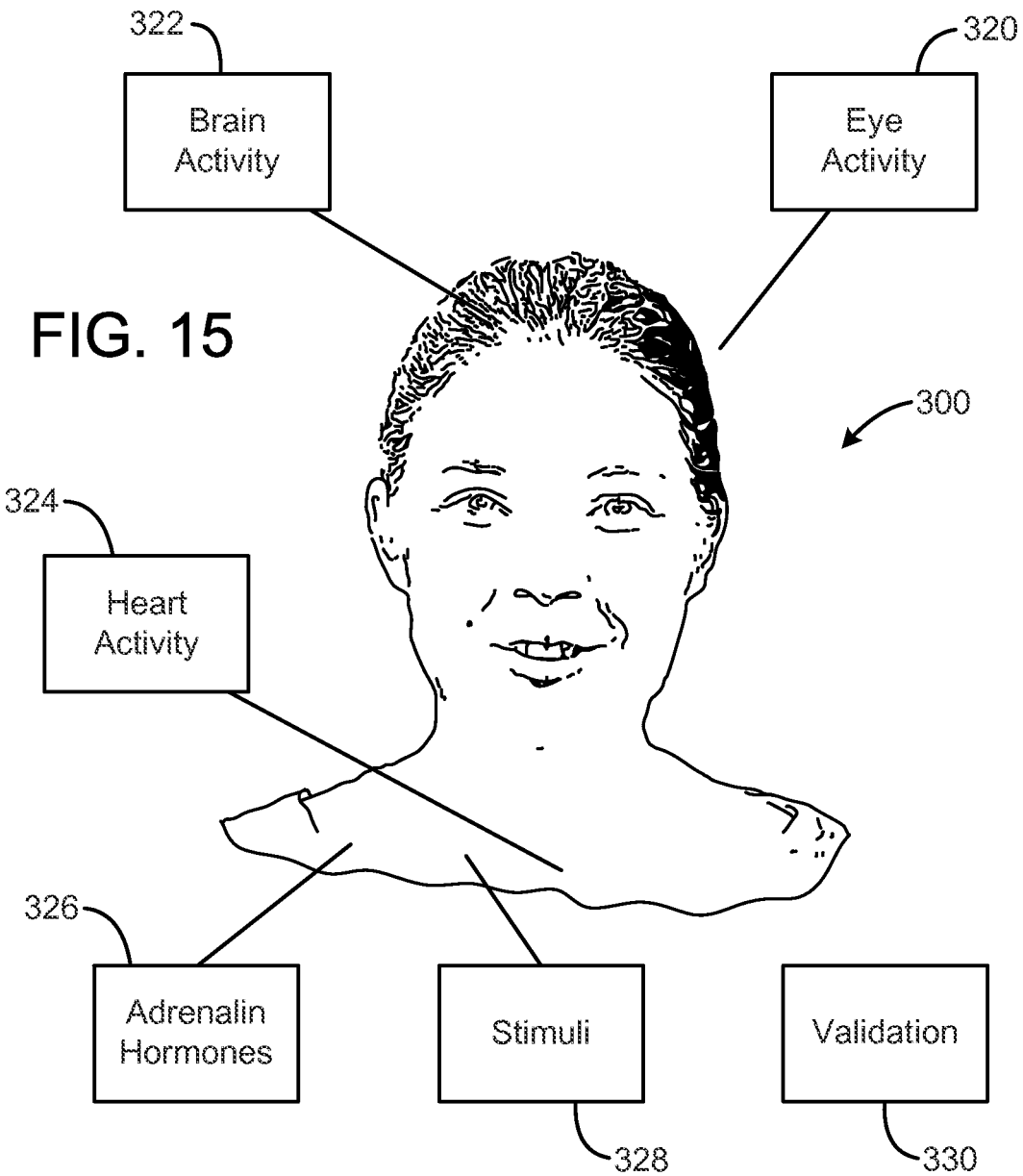
FIG. 15 is a front view of the face of FIG. 11 showing other physiological data used when determining a facial expression.

FIG. 15 illustrates how the movement of the coordinates (direction, velocity and acceleration) may be associated with other relevant data such as physiological data and reactions. More particularly, the eye activity 320 may be considered such as where the person is looking during the emotional reaction. The brain activity 322 of the person of the face 300 may be connected at a specific frequency pattern or activity such by using fMRI, MEG or EEG. The heart activity 324 may be measured such as by using EKG to determine the variability of the heart rhythm.

Hormones/neurotransmitters 326 such as oxytocin and vasopressin or indicators of parasympathetic or sympathetic activity may be measured during body and facial movements or movement routines/frequencies of the person. Stimuli 328 may be measured relative to specific movements of the person. A validation process 330 may also be used to verify the emotional intensity by using the emotional reactions of a large number of other people by using established approximation method.

While the present invention has been described in accordance with preferred compositions and embodiments, it is to be understood that certain substitutions and alterations may be made thereto without departing from the spirit and scope of the following claims.

The invention claimed is:

1. A method for analyzing a virtual face, comprising:
providing a virtual face of a body on a screen associated with a communication device having a cursor;
dragging a facial component of the virtual face with the cursor from a first position to a second position to change the virtual face from having a first expression to a second expression, the second expression being different from the first expression;
providing a measurement device for determining coordinates of facial components of expressions of feelings;
the measurement device determining a direction, speed and acceleration of the facial component on the virtual face;
determining physiological data of the body, the physiological data consisting essentially of skin temperature, skin conductivity, brain frequency and pupil size;
the communication device matching the coordinates and measured data of the facial component and physiological data with expression coordinates and data of facial components and physiological data stored in a database, the expression coordinates representing previously stored expression of feelings displayed by the virtual face;
associating a written or oral description with the identified facial expression coordinates.

2. The method according to claim 1 wherein the method further comprises the steps of pre-recording words describing facial expressions in the database.

3. The method according to claim 2 wherein the method further comprises the steps of using pamphlets of facial expression coordinates of facial expressions in the database and associating each facial expression with the pre-recorded words.

4. The method according to claim 1 wherein the method further comprises the steps of feeding the word to the communication device, the communication device identifying the word in the database associating the word with a facial expression associated with the word in the database.

5. The method according to claim 4 wherein the method further comprises the steps of the screen displaying the facial expression associated with the word.

6. The method according to claim 1 wherein the method further comprises the steps of training a user to identify facial expression.

7. The method according to claim 1 wherein the method further comprises the steps of adding a facial expression to an electronic message so that the facial expression identifies a word describing a feeling in the electronic message and displaying the feeling with the virtual face.

* * * * *